United States Patent Office 3,452,658
Patented July 1, 1969

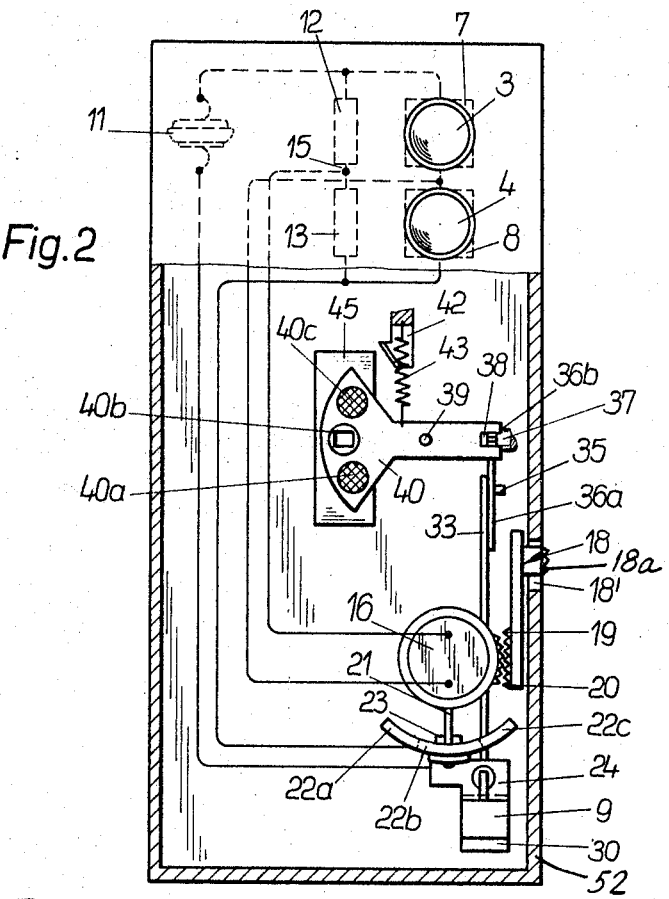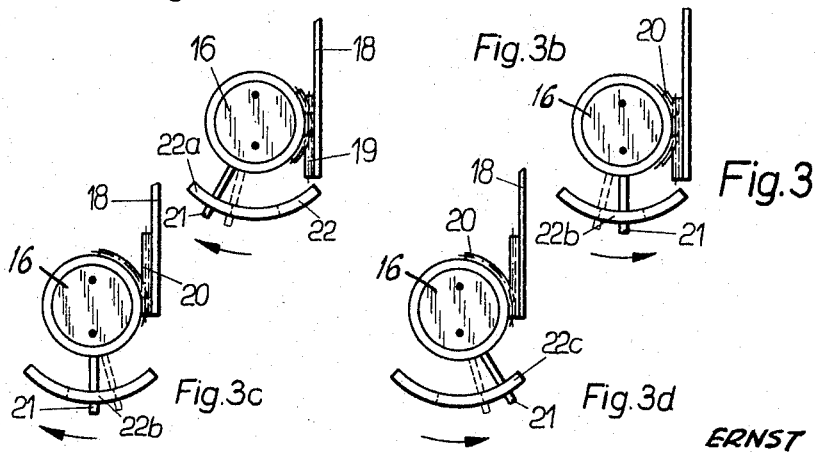

3,452,658
CAMERA CONSTRUCTION
Ernst Krull, Kronberg, Taunus, Josef Scheibel, Ober-Morlen, and Johann Roth, Dachau, Germany, assignors to Niezoldi & Kramer GmbH, Munich, Germany
Filed July 28, 1966, Ser. No. 568,653
Claims priority, application Germany, Aug. 4, 1965, N 27,130
Int. Cl. G03b *19/02*
U.S. Cl. 95—11
15 Claims

ABSTRACT OF THE DISCLOSURE

A photographic camera having a filter member positioned between the objective lens and the film guide. The filter member is mounted to position selected respective film variations in alignment with the objective lens. A measuring device connected to the filter member is operable to measure the spectral composition of the exposure light for positioning a selected one of the respective film variations in alignment with the objective lens. The measuring device includes a voltage meter and photosensitive elements. A setting device is operable to adjust the meter is accordance with the type of film in the film guide.

---

This invention relates, in general, to a camera construction and, in particular, to a new and useful camera having a plurality of color filters which are mounted so that they may be moved by control means into selective positions in accordance with the exposure light.

A corrective filter must be arranged in the path of rays of the exposure light in order to adapt the spectral composition of the exposure light to the spectral sensitivity of the respective photographic material employed. If the color temperature of the exposure light, for example, daylight or artificial light, is not in agreement with the film sensitivity of the photographic material, for example, artificial or daylight film, then a corrective filter must be employed. The introduction of filters is effected in the cameras known at the present time by a manual operation usually by placing the selected filter over the camera objective lens. With such an arrangement, it is necessary to constantly check before taking a picture to see if the color temperature of the exposure light is in agreement with the type of film used for the photograph and, if necessary, to bring the respective suitable corrective filter into the path of rays of the exposure light. The obvious disadvantage of such an arrangement is that it is cumbersome to change filters continuously and, in many instances, it is either not performed or simply forgotten so the practical value of a manually operated arrangement is very doubtful.

In accordance with the present invention, there is provided a camera which includes means for sensing the characteristics of the predominate light rays, for example, red filtered light or blue filtered light and for positioning a filter in alignment with the objective lens in accordance with the light values which are sensed. A principal feature of the present invention is an arrangement which includes a mounting for the filters within the camera in a manner such that they may be brought into the path of the rays of the exposure light in accordance with the condition of the sensed light at the time the exposure is to be made. This is achieved with a camera, according to the invention, by an associated measuring and control device which measures the spectral composition of the exposure light and adapts the spectral composition of the beam produced by the photographic objective to correspond to the measuring results by means of filters which are adapted to the spectral sensitivity of the film material which is inserted into the camera. The camera thus makes it possible to take color temperature correct pictures both at daylight and with artificial light and either when using daylight or artificial light film without having any special preparation before the picture is taken.

In a preferred arrangement of the invention, the camera advantageously includes a storage compartment for the film which includes means which are actuated in accordance with the type of film magazine which is inserted so that the light condition measuring device is set in accordance with this film type to insure that a proper filter is aligned with the camera lens when the film is exposed.

The measuring and control device, in accordance with the invention, is formed of a measuring mechanism which deflects according to the differential voltage of two photosensitive elements which respond differently to daylight and artificial light. For example, such photosensitive elements may comprise electric cells or photo resistances. The photosensitive elements are advantageously aligned with respective filter elements, for example, a blue filter and a red filter, respectively, and they actuate an instrument in accordance with the variation of the voltages therebetween to shift an indicator of the instrument for actuating the mechanism to position a proper filter in alignment with the camera lens. The measuring and control device may be set in accordance with the film which is employed in the camera so that the filters which will be positioned in alignment with the lens will be in accordance with this film type.

Accordingly, it is an object of the invention to provide a camera having means for positioning filters in alignment with the objective lens automatically in accordance with the exposure light conditions.

A further object of the invention is to provide a camera having means for sensing separately various exposure light conditions, for example, the light which is transmitted through a blue filter and the light which is transmitted through a red filter and for positioning a filter in alignment with the camera lens in accordance with the variations of the light which are sensed by the two filters.

A further object of the invention is to provide a camera having means for automatically positioning filter elements in alignment with the lens which may be set in accordance with the type of film which is employed and which will advantageously be operable before each exposure in order to ensure that the proper filter is positioned in alignment with the lens during each exposure.

A further object of the invention is to provide a simple mechanism and electrical arrangement for automatically positioning a filter in alignment with a lens of the camera in accordance with the conditions of the exposure light.

A further object of the invention is to provide a camera which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 2 is a section taken along the line 2—2 of FIG. 1; and

FIGS. 3a to 3d are partial rear elevational views of the pointer and exposure light measuring meter indicating the various positions thereof in accordance with the exposure light and spectral sensitivity of the film which is inserted in the camera.

Figure 1:
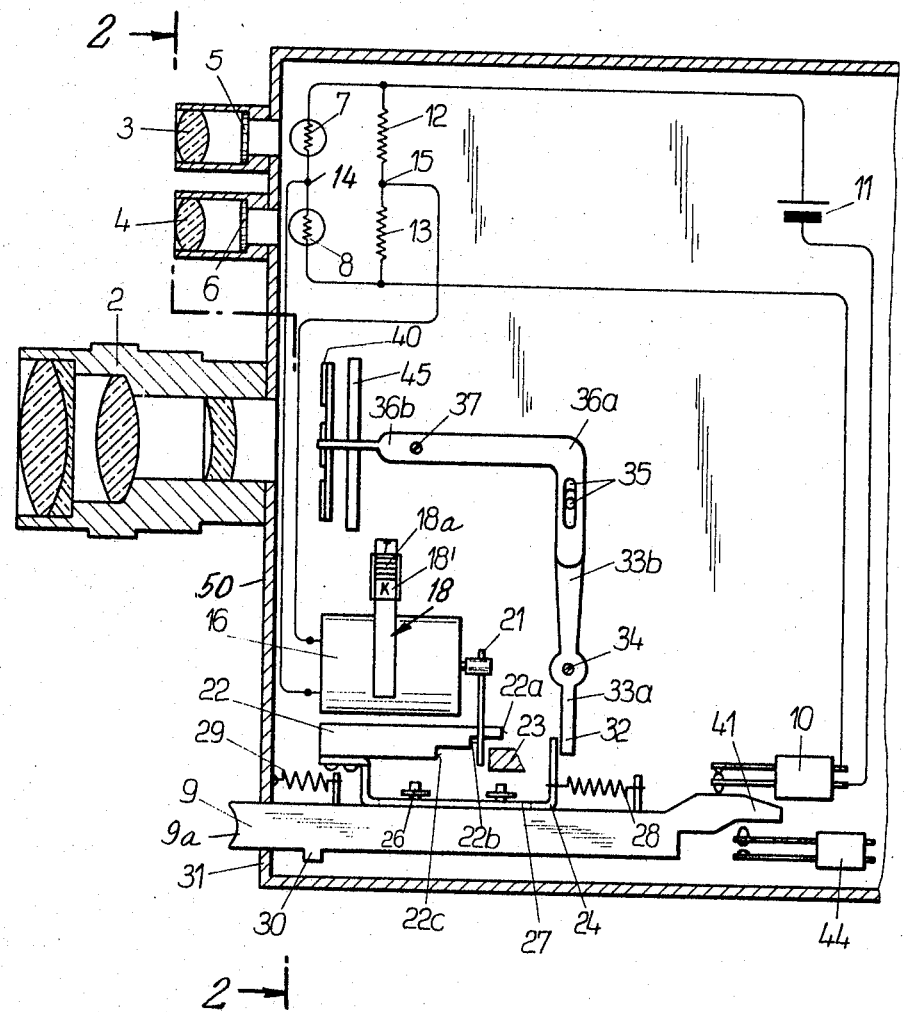
FIG. 1 is a schematic and longitudinal sectional view of a camera constructed in accordance with the invention.

Referring to the drawings, in particular, the invention embodied therein comprises a camera having a photographic objective lens 2 as well as two objectives 3 and 4 which are associated with a measuring device for sensing the characteristics of the exposure light.

In accordance with the invention, the objectives 3 and 4 separately conduct the exposure light through a red filter 5 and through a blue filter 6 to photoresistances 7 and 8, respectively, which are arranged directly behind them. The photoresistances 7 and 8 are connected in series with a switch 10 and a power supply or current flow producing device such as a battery 11. The switch 10 is actuated to close the power circuit by a release member 9 which has a portion 9a which projects out through a front wall 50 of the camera. The measuring circuit also includes fixed resistors 12 and 13 which are disposed in parallel to the photoresistances 7 and 8 and whose resistance values correspond to those of the photoresistances with the incidence of light completely shut off. A center tap 14 is made between the photoresistances 7 and 8 and extends to a terminal of a meter or measuring device 16 and a center tap 15 is made between the resistances 12 and 13 and extends to the other terminal of the meter 16.

The exposure meter 16 is mounted within the camera such that its housing may be rotated in order to vary its initial or zero position in accordance with the spectral sensitivity of the film which is being employed in the camera at any given time. The turning of the exposure meter is advantageously accomplished either automatically in accordance with the setting or a magazine (not shown) or manually by a movable connecting piece or rack member 18 which includes a button or finger actuating portion 18a which projects outwardly through an opening 18' in a side wall 52 of the camera. The movable connecting piece 18 also includes a rack portion 19 which is in engagement with a gear segment 20 defined around a portion of the periphery of the meter 16. Means (not shown) are provided for guiding the connecting piece for movement between two end positions either by manual operation or by the control from a magazine upon insertion into the camera. The end positions correspond to the type of film, that is, daylight or artificial light film which is to be contained in the camera. The respective positions of the end piece can be usually viewed from the outside of the camera through the window 18'.

The meter 16 is provided with a pointer 21 which extends outwardly therefrom and rotates in the range of a scanner which, in the embodiment illustrated, includes a cam member 22 having at least three separate pointer arresting areas or step portions 22a, 22b and 22c. A release for the camera includes the release member 9 which is moved manually by depressing the button 9a to cause the scanner with the cam 22 to be moved against the pointer 21 and an associated stop 23. The pointer 21 will be lodged on a step 22a or 22b or 22c in accordance with the position of the pointer as determined by the conditions of the exposure light which are measured by the measuring and control device and the amount of scanner movement will be determined by the step which engages the pointer.

The scanner cam 22 is mounted on a movable support 24 which is connected to the release member 9 by pins 26 which ride in slots 27 of the member 24 and thus permit relative displacement of the member 24 in respect to the release member 9. A tension spring 28 urges the member 24 to the right end position as indicated in FIG. 1. The release member 9 is biased by tension spring 29 secured to the front wall 50 in a direction to the left to urge a projection 30 to bear against a stop 31 formed by the interior of the wall 50. In the starting position, at which the projection 30 bears against the stop 31, the The support 24 of the scanner 22 has a bent off extension 32 which is located within the range of an arm 33a of a double lever member or actuator 33 which is pivotally mounted on the instrument at 34. The arm 33 also includes a portion 33b which is operatively connected by a pin slot guide 34 and 35 with the bent off arm 36a of a double lever member 36 which pivots on a pin 37 secured in the housing. The arm 36b engages into a recess 38 of a filter disk member 40 which is pivotally mounted on a pin member or shaft 39 carried in the housing. The filter disk member 40 is of sector-shape and has three filter variations or openings that can be brought into selective alignment with the optical axis of the photographic objective 2 in front of the film guide 45. The filter disk 40 carries a red filter 40c at its upper portion and a blue filter 40a at its lower portion and includes a central opening or clear filter window 40b providing little or no filtering action. The filter disk 40 can thus be swung into three different operative positions for positioning any one of the filter variations in alignment with the camera optical axis. The movement will be effected by the shifting of the support 24 in an amount corresponding to the position of the engagement of the pointer 21 with the scanner cam 22.

The operation of the device is as follows: By pressing the release 9, the contacts of the switch 10 are closed by the action of a cam portion 41 of the release member 9. This closes the measuring circuit before the pointer 21 has reached any step of the scanner cam 22. The same voltage drop will be produced at the parallel and equivalent resistances 7 and 12 and 8 and 13, respectively, provided no light falls on the photoresistances 7 and 8. When the center taps 14 and 15 have the same voltage, the meter 16 does not respond and its pointer remains in its respective zero position.

The zero position of the pointer can be varied by turning the entire meter by moving the connecting piece 18. In the upper position of the connecting piece 18, the spectral sensitivity of an artificial light film is fed into the meter as indicated in accordance with FIGS. 1 and 2. In the lower position of the connecting piece 18, the spectral sensitivity of a daylight film is fed into the meter. With the daylight film inserted into the camera, the zero position of the pointer 21 is between the steps 22a and 22b and with artificial light film, it is between the steps 22b and 22c of the scanner cam 22.

The meter 16 is so connected to the center taps 14 and 15 that when the resistance value of the photoresistance 7 diminishes, for example, due to a greater incidence of light with artificial light through the red filter 5, the pointer deflects to the left. The opposite is true when a greater incidence of light through the blue filter 6 with daylight occurs at which time the pointer will be moved to the right the deflection being on the average of about half a step width.

As indicated in FIG. 3a, the pointer 21 is shown in a position when pictures are to be taken with artificial light and with daylight film. The solid line position is the zero position and the dotted line position indicates the range of a farthest protruding step 22a. The arrangement is such that the scanner pointer 21 will not advance further in respect to this scanner cam. Filter disk 40 will thus remain in its basic position determined by the stop 42 secured on the instrument. In this basic position, with the member 40 against the stop 42, the blue corrective filter 40a will be in alignment with the photographic axis of the camera so that the major red portion of the artificial light is filtered out and the latter is not adapted to the spectral sensitivity of the daylight film.

If daylight pictures are to be taken with the same film, the pointer 21 moves according to FIG. 3b into the range of the central step 22b of the scanner 22. The latter is thus carried along by the release 9 until this step strikes against the pointer 21. The support 24 actuates the levers 33 and 36 accordingly so that the central opening 40b will lie along the optical axis of the photographic objective 2 and the daylight will arrive on the film unfiltered.

The same position of the filter disk 40 is obtained when pictures are taken at artificial light with artificial light film. In this case, the pointer 21 moves according to FIG. 3c from its dotted line zero position into the range of the central step 22b of the scanner so that the filter disk 40 is swung into its central position.

If the pictures are to be taken at daylight with artificial light film, the pointer 21 as indicated in FIG. 3d will be moved from the dotted line position into the range of the step 22c of the scanner cam 22. Thus, the scanner cam 22 will be carried along by the release member 9 until the step 22c strikes against the pointer 21. This causes the filter disk 40 to be rotated to such an extent that its red corrective filter 40c is aligned with the axis of the objective lens 2. The photographic beam in this instance will be adapted to the spectral sensitivity of the artificial light film by filterering out the excessive blue portion.

After the pointer 21 and the filter disk 40 have assumed their respective positions corresponding to the measuring result, the release member 9 is released so that the cam 41 leaves the switch 10 and the measuring circuit is opened again and the shutter is released. With an electric shutter and an electric film feed, a switch 44 can be arranged at the end of the adjusting path of the release 9. The additional adjusting path of the release 9 with regard to the adjusting path of the support 24 of the scanner 22 is determined by the length of the pin slot guides 26 and 27.

After the picture is taken such as by releasing the release member 9, the member 9 is returned back to its starting position under the action of the tension spring 29. The pointer 21 is likewise released and can now deflect corresponding to the measuring value obtained for the next release. The filter disk 40 is pulled back to its basic position by the tension spring 43 against the stop 42. The measuring and control devices are set for the next release by actuation of the release member 9

In some instances, it is desirable to employ photoresistances having different spectral sensitivity instead of the filters 5 and 6. In some instances, it is also desirable to provide objectives 3 and 4 which are colored corresponding to the desired light measuring values. The apparatus which has been described has been limited to a construction in which only three operative positions of the scanner have been disclosed, but, of course, a number greater or less than this can, of course, be provided. The setting of the meter 16 may also be accomplished automatically by changing the filters in the front of the photoresistances or electrically by changing the resistance values in the measuring circuit.

It is of advantage to provide means in the camera for influencing the exposure meter of the camera. Thus, when the color filters are moved into the path of the rays of the exposure light, optical or electrical resistances may be connected into the exposure measuring circuit in order to correct the respective light value which is measured. If the exposure is measured in the path of rays of the photographic objective behind the corrective filters, the unfiltered beam which is thus weakened in its luminous density will influence the exposure measurement in a corrective sense so that the above mentioned means can be eliminated.

What is claimed is:

1. A photographic camera comprising, in combination, a housing having therein a film guide arranged to receive films of different types as to light sensitivity; an objective lens on said housing operable to expose film positioned in alignment therewith in said film guide; a filter member positioned between said objective lens and said film guide, said filter member carrying respective filter variations; means mounting said filter member for movement relative to said objective lens to position a selected respective film variation in alignment with said objective lens to influence the light incident upon film in said film guide; measuring means connected to said filter member and operable to measure the spectral composition of the exposure light for positioning a selected one of said respective filter variations in alignment with said objective lens to correct the spectral composition of the light incident upon the film in accordance with the measured value of the spectral composition of the exposure light; said measuring means including a voltage meter, first and second photosensitive elements responding differently to artificial light and daylight, respectively, connected to said meter and influencing the indication thereof in accordance with the voltage differential between said first and second photosensitive elements, and means operable to expose said photosensitive elements to the exposure light; and setting means operable to adjust said meter in accordance with the type of film then in said film guide.

2. A photographic camera, according to claim 1, wherein said setting means is automatically operated in accordance with the type of film which is inserted into the camera.

3. A photographic camera, according to claim 1, wherein said filter member includes a filter permitting the passage of light, a blue filter and a red filter.

4. A photographic camera, according to claim 3, wherein said filter for passing light comprises an opening in said filter member.

5. A photographic camera comprising a housing, a film guide in said housing, an objective lens mounted on said housing and in a position to expose film which is positioned on said film guide, a filter member having a plurality of light filter variations defined thereon mounted adjacent said lens and being movable for positioning a selected filter variation in alignment with said lens for influencing the light directed therethrough to the film on the film guide, and measuring means connected to said filter member for measuring the spectral composition of the exposure light and for positioning one of the filter variations of said filter member in alignment with said lens for correcting the spectral composition of the light in an amount corresponding to the measured value, said measuring means including first and second openings in said camera having first and second filtering members of different characteristics therein, respectively, a first photoresistance in alignment with said first opening, a second photoresistance in alignment with said second opening, first and second fixed resistances connected in parallel to said first and second photoresistances and a meter connected in parallel to said first and second photoresistances, and a meter connected to respective central taps between said first and second photoresistances and said first and second fixed resistances for measuring any differential voltage between said photoresistances, said meter including a movable pointer, a release member movable to electrically connect said first and second photoresistances and said first and second fixed resistances to an electrical current source, a scanner cam connected to said release member and being movable therewith and having a cam member with a plurality of steps thereon each of said steps being alignable with said pointer in accordance with the position of deflection of said pointer, said scanner cam being movable to engage said pointer by an amount at which said pointer engages on a step which is aligned therewith, and means disposed in the path of movement of said scanner cam and connected to said filter member for shifting said filter member by an amount corresponding to the amount of movement of said scanner cam permitted by said pointer.

6. A photographic camera, according to claim 5, wherein said scanner cam is mounted on said release member but is slidably movable in respect thereto by a predetermined limited amount.

7. A photographic camera, according to claim 6, wherein said scanner cam comprises a supporting member having a slot defined therein, a pin carried on said release member and confined in said slot permitting relative movement of said scanner cam by an amount corresponding to the length of said slot, means urging said release member to a fixed position at which said release member does not supply curent to said photoesistances, means biasing said scanner member in position opposite to the initial position of said release member and a double lever member pivotally mounted in said housing with an arm portion disposed in alignment with said scanner member and being displaceable thereby to change the position of said filter member in accordance with the amount of movement of said scanner member as determined by the position of said pointer when engaged in a respective step.

8. A photographic camera, according to claim 7, wherein said filter member comprises a segment portion having a open area for the passage of rays from exposure lens when the spectral composition of the exposure light and the spectral sensitivity of the film material correspond and a blue filter and a red filter, means biasing said filter member against a stop with said blue filter positioned in alignment with the camera lens axis.

9. A photographic camera, according to claim 5, including means for shifting the initial position of said meter pointer.

10. A photographic camera, according to claim 9, wherein said meter is mounted in said housing for rotatable movement, and means manipulatable from the exterior of said camera to shift said meter for varying the initial position thereof in respect to said scanner.

11. A photographic camera, according to claim 10, wherein said last-named means comprises a segment defined on the exterior of said meter and a slidable rack member engaged with said segment and being displaceable for shifting said segment with said meter for varying the initial position thereof in accordance with the type of film which is to be employed in the camera.

12. A photographic camera comprising a housing, a film guide in said housing, an objective lens mounted on said housing and in a position to expose film which is positioned on said film guide, a filter member having a plurality of light filter variations defined thereon mounted adjacent said lens and being movable for positioning a selected filter variation in alignment with said lens for influencing the light directed therethrough to the film on the film guide, and measuring means connected to said filter member for measuring the spectral composition of the exposure light and for positioning one of the filter variations of said filter member in alignment with said lens for correcting the spectral composition of the light in an amount corresponding to the measured value, said measuring means including a meter for measuring differences in exposure light, said filter member is pivotally mounted in said housing, a scanner cam disposed adjacent said meter, said meter having a movable pointer member movable in accordance with the exposure light characteristics, said scanner cam having a plurality of step portions which may be individually engaged with said pointer in accordance with the position thereof, and release means for moving said scanner cam to move said scanner cam past said pointer to cause said pointer to become lodged on a step portion thereof in accordance with the position of said pointer, an actuating lever disposed with an arm portion in alignment with said release means and being movable by movement of said release means by an amount corresponding to the amount at which the pointer becomes lodged in a step of said scanner cam to shift said filter member.

13. A photographic camera comprising a housing, a film guide in said housing, an objective lens mounted on said housing and in a position to expose film which is positioned on said film guide, a filter member having a plurality of light filter variations defined thereon mounted adjacent said lens and being movable for positioning on a selected filter variation in alignment with said lens for influencing the light directed therethrough to the film on the film guide, and measuring means connected to said filter member for measuring the spectral composition of the exposure light and for positioning one of the filter variations of said filter member in alignment with said lens for correcting the spectral composition of the light in an amount corresponding to the measured value, said means for measuring the spectral composition of the exposure light and for positioning a filter of said filter member in alignment with the lens includes a movable release member connected to said filter member connectable to said filter member for shifting said filter member and being movable for actuating and deactuating said measuring means.

14. A photographic camera comprising a housing, a film guide in said housing, an objective lens mounted on said housing and in a position to expose film which is positioned on said film guide, a filter member having a plurality of light filter variations defined thereon mounted adjacent said lens and being movable for positioning on a selected filter variation in alignment with said lens for influencing the light directed therethrough to the film on the film guide, and measuring means connected to said filter member for measuring the spectral composition of the exposure light and for positioning one of the filter variations of said filter member in alignment with said lens for correcting the spectral composition of the light in an amount corresponding to the measured value, said measuring means including a plurality of photoresistances, means for subjecting said photoresistances to the influence of various filtered light, meter means for measuring the differences of the filtrered light between at least two of said photoresistances, electrical circuit means connected to said photoresistances for supplying current thereto including an actuable switch, a camera release member slidable in said camera housing and engageable with said switch for actuating said photoresistances, and scanner means movable in accordance with the indication of said meter to shift said filter member.

15. A photographic camera, according to claim 14, wherein said release member effects actuation of said photoresistances, and is connected to said scanner means to move said scanner means by an amount corresponding to the indication of said meter, and is also connected to said film guide for adjustig the film feed of said camera.

References Cited

UNITED STATES PATENTS

| | | | |
|---|---|---|---|
| 3,049,969 | 8/1962 | Clapp | 95—10 X |
| 3,246,586 | 4/1966 | Hunt | 95—11 |
| 3,099,194 | 7/1963 | Weiss et al. | 95—10 |
| 3,208,363 | 9/1965 | Easterly et al. | 95—11 |
| 3,314,344 | 4/1967 | Anwyl et al. | 95—10 |

NORTON ANSHER, *Primary Examiner.*

C. E. SMITH, *Assistant Examiner.*

U.S. Cl. X.R.

95—10